United States Patent [19]

Slife et al.

[11] Patent Number: 5,247,574
[45] Date of Patent: Sep. 21, 1993

[54] ADAPTIVE NO BALANCE DX SIGNALLING CIRCUIT

[75] Inventors: Jimmy D. Slife, Aurora; David J. Farrell, Lafayette, both of Colo.

[73] Assignee: XEL Communications, Inc., Aurora, Colo.

[21] Appl. No.: 555,562

[22] Filed: Jul. 19, 1990

[51] Int. Cl.$^5$ .......................................... H04M 11/00
[52] U.S. Cl. ..................................... 379/377; 379/236
[58] Field of Search ............... 379/377, 400, 401, 403, 379/236, 237, 240

[56] References Cited

U.S. PATENT DOCUMENTS

| | | | |
|---|---|---|---|
| 3,999,013 | 12/1976 | Reed et al. | 178/58 A |
| 4,101,733 | 7/1978 | Whittaker | 178/58 R |
| 4,811,389 | 3/1989 | Balch | 379/377 |
| 4,815,124 | 3/1989 | Bowers et al. | 379/236 |
| 4,872,198 | 10/1989 | Sues et al. | 379/377 |
| 5,109,409 | 4/1992 | Bomgardner et al. | 379/377 |

Primary Examiner—James L. Dwyer
Assistant Examiner—Ahmad F. Matar
Attorney, Agent, or Firm—Dorr, Carson, Sloan & Peterson

[57] ABSTRACT

The no balance duplex signalling circuit eliminates the need for setting balance resistors and capacitors to match or be proportional to cable resistance and capacitance as was required of previous duplex signalling circuit designs. A microcomputer is also used to evaluate the output of a simple loop current and voltage sensing circuit to dynamically determine the signalling state of the far end of the trunk conductors. The microcomputer stores a plurality of data which indicate signalling thresholds for all possible duplex signalling states. The microcomputer can then compare the measured voltage and current on the trunk conductors to automatically make a determination of the signalling state based on the stored data indicative of permissible signalling states.

5 Claims, 4 Drawing Sheets

ADAPTIVE NO BALANCE DX SIGNALLING CIRCUIT

FIELD OF THE INVENTION

This invention relates to telephone transmission systems and, in particular, to an adaptable DX signalling circuit that does not require manual balancing.

PROBLEM

It is a problem in the field of telephone transmission systems to provide an accurate yet adaptable DX signalling circuit that is simple to install and able to work with wide range of cable types and ground voltage differences. Trunk circuits are used to interconnect telephone switching systems and to carry communication and control signals between the interconnected switching systems. The DX signalling circuit is an interface that provides the DC signalling function on the communication pair that interconnects the two switching systems. One conventional way of providing duplex signalling for telephone trunk networks is performed using four winding polar relays that are responsive to both the magnitude and direction of the current applied to the windings thereof. These relays are bulky and relatively imprecise in their operation.

An alternative solid state duplex signalling circuit is disclosed in U.S. Pat. No. 3,999,013 issued Dec. 21, 1976 to Thomas D. Reed et al. The Reed patent discloses a solid state sensor that is used in a duplex signalling circuit to monitor the signals on the A and M leads and output signals on the E lead indicative of the signalling state of the trunk circuit. The signalling apparatus of the Reed patent makes use of a pair of optoisolator devices, each connected to one lead of the communication pair of the trunk circuit and also connected to the M signalling lead for detecting the DC signalling on the communication pair. A difficulty with this circuit is that it is designed with a predefined fixed signalling threshold and requires a balanced termination to the communication pair.

U.S. Pat. No. 4,101,733 issued Jul. 18, 1978 to Donald R. Whitaker discloses another solid state duplex signalling circuit that is implemented using solid state components. The Whitaker duplex signalling circuit performs algebraic additions and subtractions of voltage and compares the results within an operational amplifier to produce the known outputs for E and M signalling in the telecommunication system. An additional operational amplifier is provided to produce a delayed response to signals of longer than a predetermined duration. The Whitaker circuit replaces the windings of the four winding relay with individual resistors. The voltage drop across the resistors is used to operate the comparator amplifier to produce the output which would result from the operation of the relay. Furthermore, the Whitaker circuit includes a plurality of switches which allow the manual switching in and out of resistors and capacitors for line and network balance combinations through a RC network.

All of the above described prior art circuits are analog circuits that use fixed thresholds to determine the state of signalling on the trunk circuit. Furthermore, all of these circuits require a balanced connection to the conductors of the trunk circuit in order to function properly and extensive craftsperson effort to properly install.

SOLUTION

The above described problems are solved and a technical advance achieved in the art by the no balance duplex signalling circuit of the present invention. This solid state circuit eliminates the need for setting balance resistors and capacitors to match or be proportional to cable resistance and capacitance as was required of previous duplex signalling circuit designs. Furthermore, a simple loop current and voltage sensing circuit is provided to determine the signalling condition of the conductors of the trunk circuit. A microcomputer is also used to evaluate the output of the loop current and voltage sensor to dynamically determine the signalling state of the far end of the trunk conductors. The microcomputer stores a plurality of data which indicate signalling thresholds for all possible duplex signalling states. The microcomputer can then compare the measured voltage and current on the trunk conductors to automatically make a determination of the signalling state based on the stored data indicative of permissible signalling states. The use of a microcomputer enables this circuit to automatically and dynamically adjust the decision thresholds based on prior signalling states and a plurality of measured signal conditions on the trunk conductors instead of on a single measured value as in the prior art.

DETAILED DESCRIPTION

Telephone trunk networks are used to interconnect telephone switching offices. These telephone trunk networks consist of digital carrier facilities that transmit both voice and control signals in encoded digital form. At each local telephone switching office a channel unit is provided to convert between the analog transmission facilities of the local loop and the digital signals of the digital carrier system. Included in the channel unit, the DX signalling unit functions to translate the duplex control signalling between the form used on the digital carrier facilities and that used in the local switching network.

Figure 1:
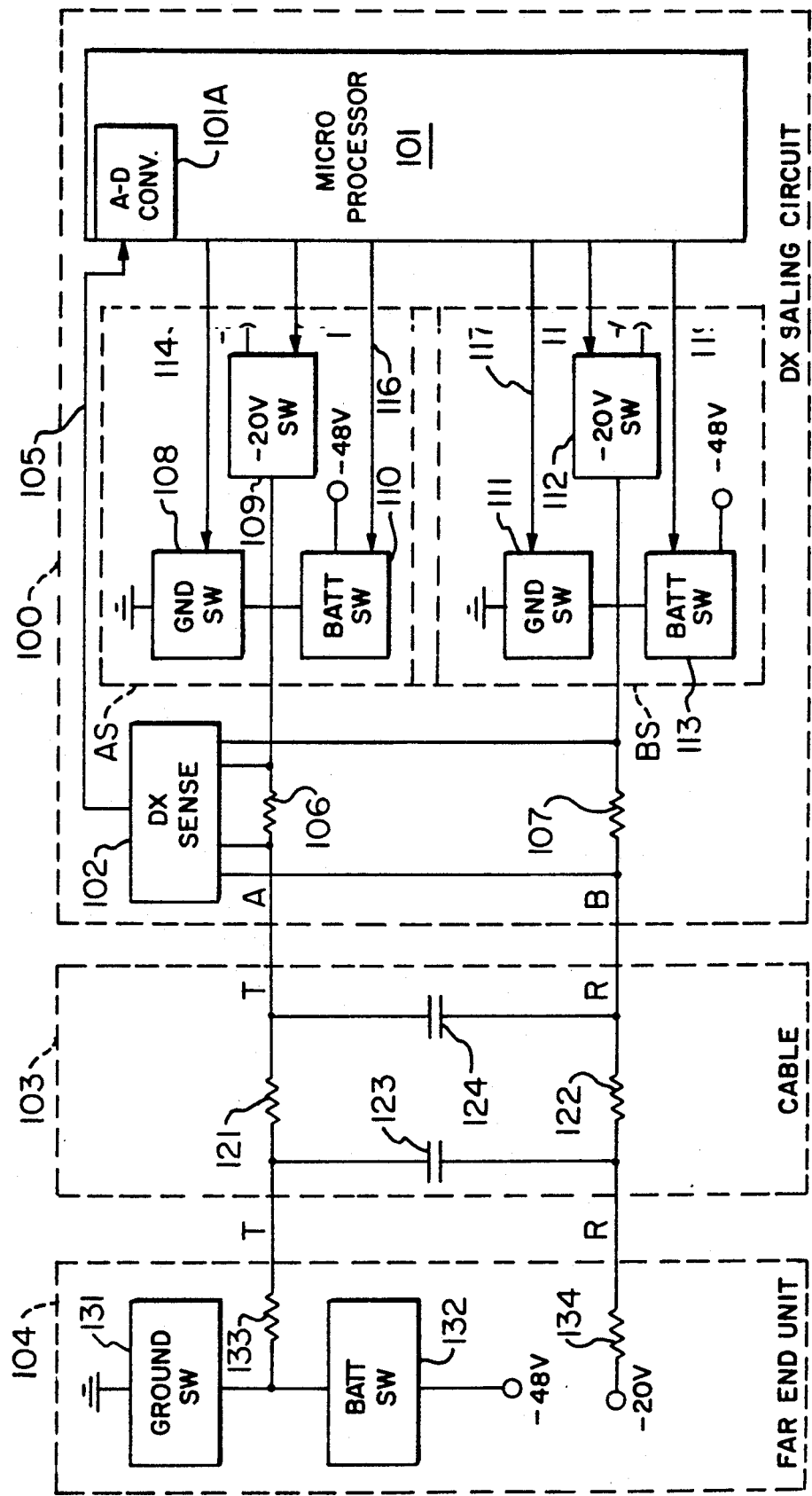
FIG. 1 illustrates the no balance duplex signalling circuit in block diagram form.

FIG. 1 illustrates the no balance duplex (DX) signalling circuit 100 in block diagram form. The DX signalling circuit 100 is connected by cable 103 to a remotely located loop terminating circuit, called the far end unit, 104. Cable 103 consists of a typical transmission media such as a metallic cable that has characteristic impedance, illustrated in FIG. 1 as resistors 121, 122 and capacitors 123, 124. The far end unit 104 includes termination resistors 133, 134 and signalling switches 131, 132. A PCM interface is included to interconnect processor 101 with the digital carrier facilities (not shown).

The DX signalling circuit 100 functions to identify the signalling state of far end unit 104 independent of the impedance of cable 103 and without requiring a balanced connection to cable 103. The no balance duplex signalling circuit 100 includes a pair of battery feed switching circuits AS, BS which operate under control of processor 101 to switchably connect a battery potential of either minus 48 volts, minus 20 volts or ground to the associated DX signalling conductors A, B, respectively. The signalling state of the trunk pair T, R is determined by use of DX sensing circuit 102 which is interposed between the DX signalling conductors A, B and the battery feed switch circuits AS, BS. DX sensing circuit 102 is connected to a pair of current sensing resistors 106, 107 which are interposed in conductors A, B respectively to sense the current flowing thereon. DX sensing circuit 102 functions to measure the current flowing in each of the DX signalling conductors A, B as well as the voltage appearing on these conductors. DX sensing circuit 102 can thereby detect the current flowing in each of the DX signalling conductors as well as the voltage appearing on each of these conductors. The measured values of these voltages and currents are output by DX sensing circuit 102 to microprocessor 101 via lead 105. Microprocessor 101 has stored therein a table of signal thresholds indicative of the various signalling states of the conductors of the trunk pair T, R. Microprocessor 101 uses the measured voltages and currents received from DX sensing circuit 102 to determine the signalling state of the trunk pair T, R.

Battery feed switches AS, BS each include a plurality of switches 108-110, 111-113, respectively to interconnect the associated DX signalling conductors A, B with either ground, minus 20 volts, or minus 48 volts, respectively under control of microprocessor 101 via control signalling leads 114-116, 117-119, respectively.

DX SENSING CIRCUIT

Figure 2:
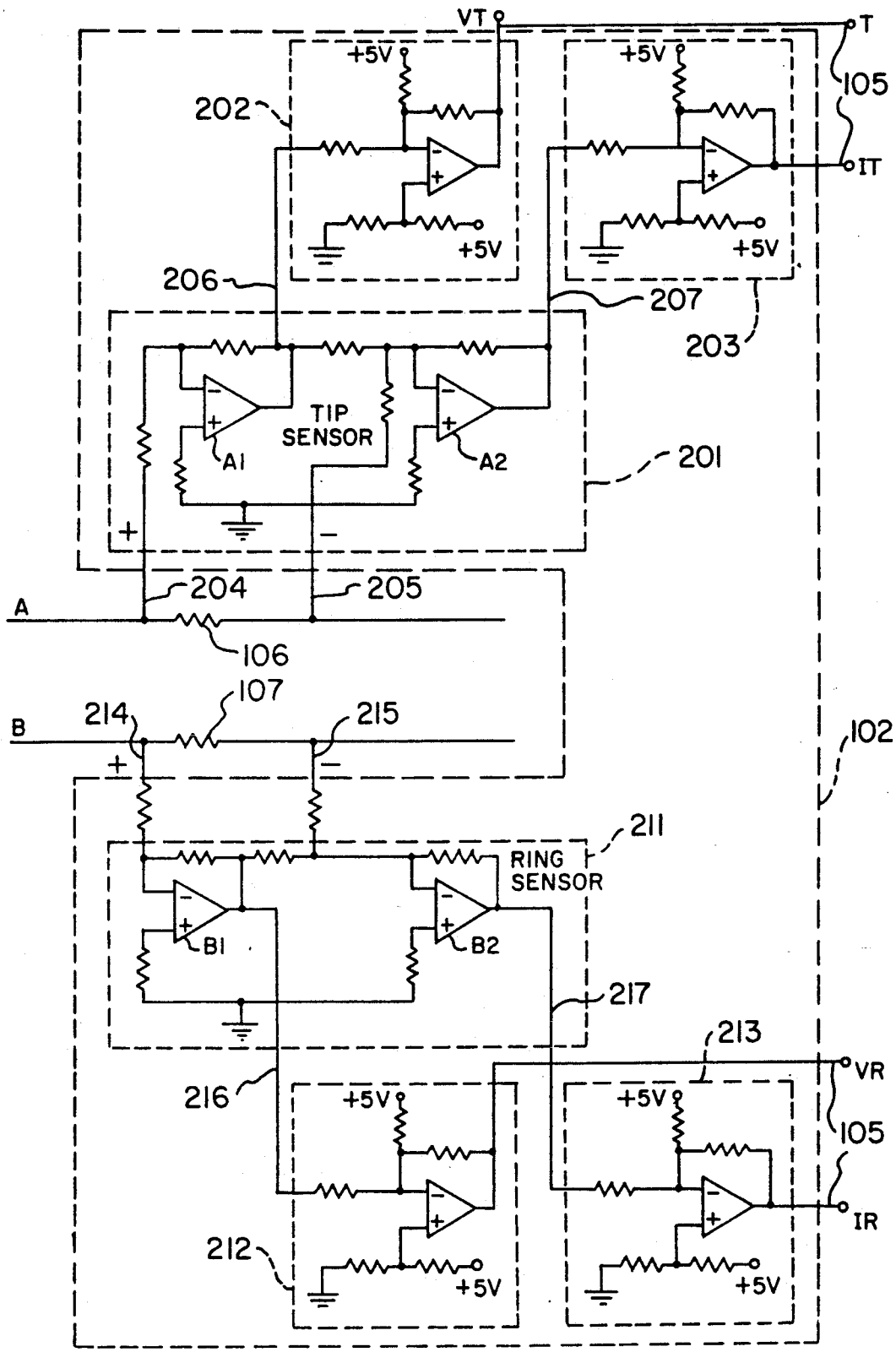
FIGS. 2 and 3 illustrate two embodiments of the sensor circuit.
Figure 3:
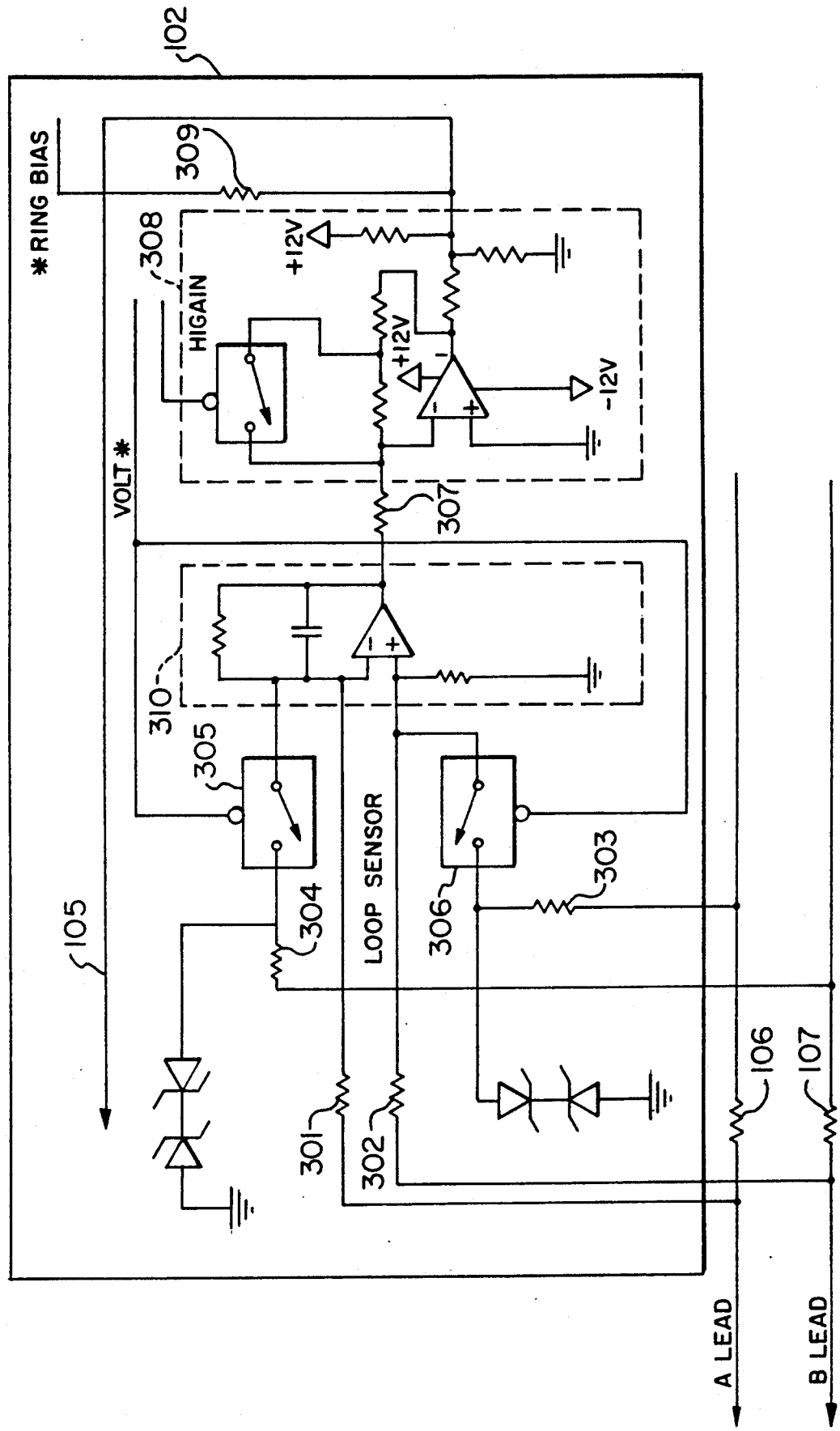

FIGS. 2 and 3 illustrate two embodiments of the DX sensing circuit 102. The circuit illustrated in FIG. 2 consists of a symmetrical circuit arrangement each half of which senses the voltage and current on one of the DX signalling conductors A, B. The circuit of FIG. 3 consists of a composite circuit that can be switched to sense either the current or the voltage on the DX signalling conductors A, B.

The circuit in FIG. 2 illustrates tip sensor circuit 201 which is connected via signal leads 204, 205 across resistor 106, which is interposed in series in DX signalling conductor A. Tip sensor circuit 201 includes two differential amplifiers A1, A2 which sense the voltage on conductor A and the current on conductor A, respectively. Amplifier A1 determines the voltage appearing on conductor A, as presented by lead 204, measured with respect to circuit ground. This measured voltage is output on lead 206 to differential amplifier 202, which produces an analog voltage output signal on lead VT, which is indicative of the voltage present on conductor A. Amplifier A2 in tip sensor 201 measures the current flowing on conductor A, as indicated by the voltage differential across resistor 106 as applied to amplifier A2 via leads 204, 205. This measured voltage differential is output on lead 207 to differential amplifier 203 which produces an analog output voltage on lead IT indicative of the current flowing on conductor A.

In similar fashion, ring sensor circuit 211 includes two differential amplifiers B1, B2 which are connected via signal leads 214, 215 across resistor 107, which is interposed in series in DX signalling conductor B. Amplifier B1 determines the voltage appearing on conductor B as measured with respect to circuit ground in the same fashion as amplifier A1 in tip sensor circuit 201. This measured voltage is output on lead 216 to differential amplifier 212, which produces an analog voltage output signal on lead VR, which is indicative of the voltage present on conductor B. Amplifier B2 in ring sensor circuit 211 measures the current flowing on conductor B, as indicated by the differential voltage appearing across resistor 107, as applied by leads 214 and 215 to amplifier B2. Amplifier B2 produces an output signal on lead 217 to differential amplifier 213 which produces an analog output voltage on lead IR indicative of the current flowing on conductor B.

The analog signals on leads VT, IT, VR, IR are applied to analog to digital converter 101A, which converts these signals into digital equivalents for storage in the memory of microprocessor 101. Analog to digital converter 101A can be part of DX sense circuit 105 or, as shown in FIG. 1, an integral part of microprocessor 101, which scans the outputs of analog to digital converter 101A and controls the writing of the output data into memory.

This dual sensor circuit of FIG. 2 produces output signals indicative of the voltage and current flowing on each of DX signalling conductors A and B, respectively by the use of a set of sensor circuits for each one of the conductors A, B. An alternative method of determining these voltages and current values is the use of the loop sensor circuit illustrated in FIG. 3. Loop sensor circuit 102 in FIG. 3 consists of a pair of differential amplifiers 310, 308 interconnected by resistor 307. Resistors 106 and 107 interposed in series in DX signalling conductors A, B, respectively, are interconnected with differential amplifier 310. In particular, resistors 301, 303 interconnect resistor 106 to differential amplifier 310 while resistors 302, 304 interconnect resistor 107 with the input of differential amplifier 310. Resistors 301, 302 interconnect the A and B leads, respectively, directly to differential amplifier 310 while switches 305 and 306 function to switchably interconnect resistors 304, 303, respectively, to the input of differential amplifier 310. In operation, the voltage across leads A and B is measured by differential amplifier 310 when switches 305, 306 are in the disconnect state illustrated in FIG. 3. When switches 305, 306 are activated by control signal from processor 101 on lead VOLT, the switches 305, 306 close to interconnect resistors 304 and 303 to the input of differential amplifier 310. Switches 305, 306 thereby apply the differential voltage across resistors 106, 107, respectively to the input of differential amplifier 310 to obtain a measurement of the average current flowing through resistors 106, 107. The measured voltage across DX signalling conductors A and B or the measured current flowing on conductors A and B is output on lead 105 to analog to digital converter 101A in microprocessor 101.

The significant difference between the sensor circuits of FIGS. 2 and 3 is that the circuit of FIG. 2 provides an individual voltage measurement with respect to circuit ground for each of conductors A and B and a measurement of the current flowing individually in conductors A and B while the circuit of FIG. 3 measures the voltage across conductors A and B or the average current flowing through both of these conductors. In either case, DX sensing circuit 102 outputs signals indicative of the voltage and current state of the associated DX signalling conductors A and B on conductors 105 to processor 101.

Figure 5:
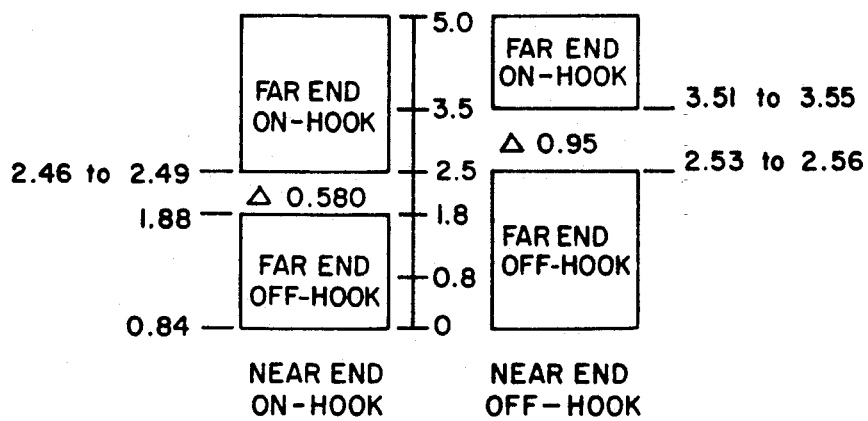
FIG. 5 illustrates in tabular form a typical set of data stored in the microprocessor indicative of various duplex signalling states.
Figure 4:
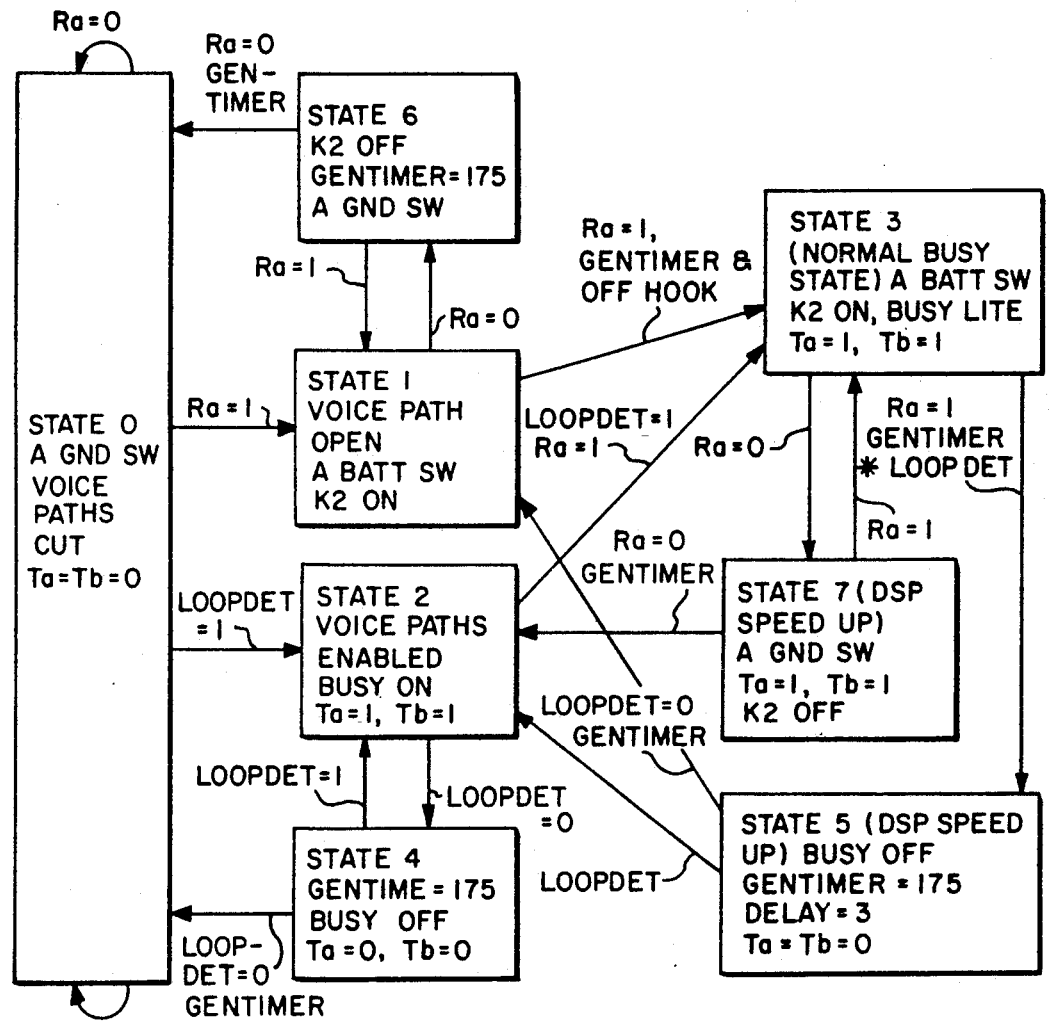
FIG. 4 illustrates in state diagram form the operational states of the no balance duplex signalling circuit.
Figure 1:
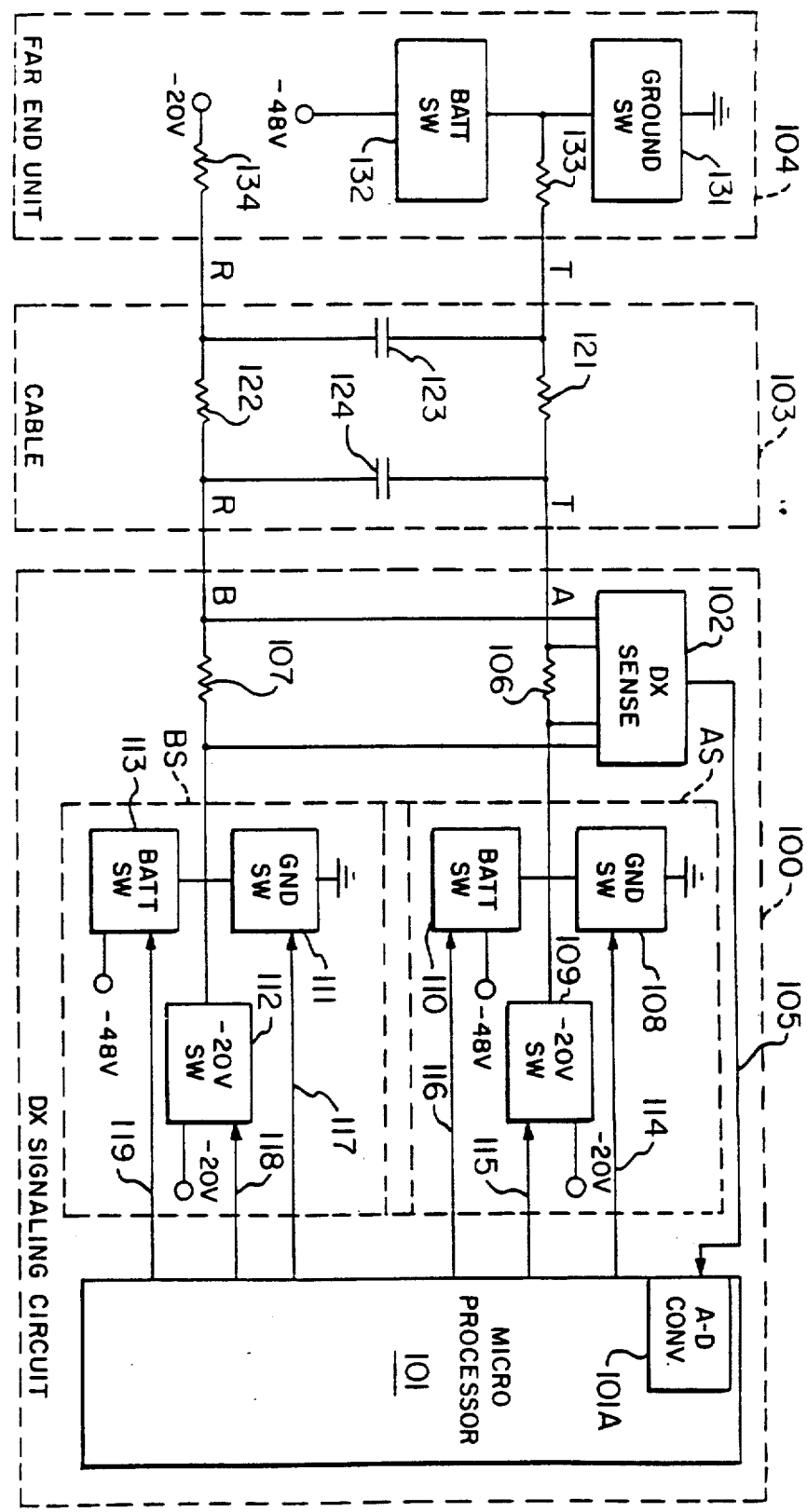

FIG. 4 illustrates in state diagram form the operational states used by a processor 101 to use the measured voltage and current signals to determine the signalling state of the duplex signalling circuit 100. In addition to the state table diagram of FIG. 4, FIG. 5 illustrates in tabular form typical set of data stored in processor 101 indicative of the thresholds used to determine the signalling state of duplex signalling circuit 100.

SIGNALLING DETERMINATION STATE TABLE

FIG. 4 illustrates in state diagram form the process used by processor 101 to determine the signalling state of DX signalling circuit 100. State 0 is the idle condition, wherein the equipment at both far end unit 104 and in the digital carrier facilities are in the on hook or idle state. At the top of state 0, a transition line exits state 0 and goes back into state 0 indicating that received A (Ra) signal from the digital carrier facilities via PCM interface is a 0 to indicate that the signalling equipment on the far end of the digital carrier is on hook. At the bottom of the state 0 block is a transition line going back into state 0 to indicate that the loop sensor 102 detects an on hook condition at the far end of the metallic circuit at far end unit 104.

A transition line exists between state 0 and state 1 when the receive A (Ra) signal from the digital carrier facilities is a 1 to indicate that the signalling equipment at the far end of the digital carrier is now in an off hook state, which causes the processor 101 to change from state 0 to state 1. In state 1, processor 101 operates the A ground switch 108 to open the path between circuit ground and conductor A and processor 101 subsequently operates the A battery switch 110 to apply battery to conductor A. Processor 101 also operates a relay K2 (not shown) to interconnect the voice path circuits to the tip and ring conductors T, R.

Once in state 1, the receive A (Ra) signal must go to a 0 for a state change to state 6 to indicate that the signalling equipment on the far end of the digital carrier facility has returned to an on hook condition or the loop sensor 102 must detect that the far end of the metallic circuit 104 has gone off hook for state change to state 3. Assume for the purpose of discussion that the far end unit 104 goes off hook. This causes a transition from state 1 to state 3 where the transmit A (Ta) and transmit B (Tb) signals of the digital carrier are now set to 1 to inform the signalling circuit of the far end of the digital carrier that the far end unit 104 is now off hook. State 3 is the busy state with the call in progress and voice communication taking place between the communication circuit at the far end of the digital carrier facilities and the far end unit 104 associated with DX signalling circuit 100.

If, from state 1, the receive A (Ra) signal went low instead of the loop sensor 102 detecting an off hook at far end unit 104, that indicates that the attempt has been abandoned by the digital carrier circuit and processor 101 enters state 6 where it deactivates relay K2 to disconnect the voice communication connection and sets an internal timer (not shown) for 175 milliseconds. If the receive A (Ra) signal remains in a 0 state for a time in excess of 175 milliseconds, the state of processor 101 changes from state 6 back to state 0, the idle state. This transition state, state 6, is used to insure the validity of the change detected in the state of the receive A (Ra) signal.

CALL CONNECTION TERMINATION

From the normal busy state, state 3, a call in progress can be terminated by either the metallic circuit at far end unit 104 going on hook or the circuit on the far end of the digital carrier going on hook. The signalling circuit at the far end unit 104 going on hook is detected by the loop sensor 102 and the circuit at the far end of the digital carrier going on hook is detected by the receive A (Ra) signal going to a 0. Thus, in state 3, if the loop detect decision is false, the state would change to state 5 while if the receive A (Ra) signal changes from a 1 to a 0 the state change occurs to state 7.

Assume, for the purpose of this discussion, that the loop detect signal is false indicating that the far end unit 104 has terminated the call connection. In this case, processor 101 enters state 5 and turns off the busy indication indicating that the call connection is being dismantled. As before, processor 101 sets a timer for 175 milliseconds and if the loop sensor 102 remains in a false state for greater than 175 milliseconds this is indicative of a true call disconnect not an erroneous signal transition. The transmit A (Ta) and transmit B (Tb) signals of the digital carrier are set to 0 to indicate to the digital carrier that the far end unit 104 is now in an on hook state. If the timer times out and there is no change in the loop detect state, processor 101 enters state 1 where a relay K2 is deactivated causing the voice communication path to open and the A battery switch 110 is disabled via lead 116 causing the battery voltage to be removed from conductor A and, in its place, ground switch 108 is activated applying a ground signal to conductor A. While in state 1, processor 101 monitors the receive A (Ra) signal from the digital carrier to indicate whether the digital carrier has now gone idle. When the digital carrier does enter an idle state, processor 101 transfers from state 1 to state 6 as described above to enter the idle state, state 0.

Alternatively, if the digital carrier initiates the call disconnect, processor 101 transfers from state 3 to state 7 where battery switch 110 is disabled to remove 48 volts from conductor A and, instead, ground switch 111 is activated to apply circuit ground to conductor A. The transmit A (Ta) and transmit B (Tb) signals to the digital carrier are in a 1 state and relay K2 is disabled thereby breaking the voice communication connection between the far end unit 104 and the digital carrier facilities. Once these actions have taken place, processor 101 transfers to state 2 where the loop sensor 102 is monitored until the far end unit 104 disconnects from the line at which point the loop sensor state becomes a 0 and processor 101 branches to state 4 where a timer is set for 175 milliseconds and the transmit A and B (Ta, Tb) signals are set to a 0 to indicate to the digital carrier unit that loop connection to the far end unit 104 has been broken. When the timer exceeds 175 milliseconds, microprocessor 101 enters the idle state 0.

Processor 101 can exit state 0 as a result of the far end unit initiating a communication connection to the digital carrier facilities. This is accomplished when the DX sensor circuit 102 indicates the presence of current on conductors A and B to indicate a loop connection. The loop detect flag is placed in a 1 state causing processor 101 to branch from state 0 to state 2 where relay K2 is activated to establish a voice communication connection between the far end unit 104 and the digital carrier facilities. The transmit A (Ta) and transmit B (Tb) signals are placed in a 1 state to the digital carrier facilities indicate the presence of an incoming call connection. If the digital carrier facilities respond with a receive A (Ra) signal in a 1 state and the loop sensor 102 remains in a 1 state, processor 101 transitions to state 3 which is the normal busy state and the communication connection is established between the far end unit 104 and the digital carrier facilities. Processor 101 disables the ground switch 108 to remove circuit ground from conductor A and instead activate battery switch 110 to apply a minus 48 volt signal to conductor A.

DX SIGNALLING CIRCUIT SENSOR THRESHOLDS

FIG. 5 illustrates the sensor thresholds used by the processor 101 in duplex signalling circuit 100 to determine the signalling state of far end unit 104 as reflected in the voltages and currents measured by loop sensor 102 and applied to leads 105. The vertical scale in the middle of the diagram is indicative of the voltage measured on the A or B conductor of the DX signalling circuit 100. The boxes on the left side of this vertical scale are indicative of the states and voltages determined when the DX signalling circuit 100 is in an on hook state. The box labeled far end off hook extends from the values 0.84 to 1.88 to indicate that, over the range of impedance values of cable 103 from no cable to the maximum cable length a far end off hook is determined when the voltage falls between these two measured values if the near end DX signalling circuit 100 is in an on hook state. The voltage is measured when the far end unit 104 is on hook varies from 2.46 to 5 volts for condition that the DX signalling circuit 100 is on hook. As can be seen from FIG. 5, there is a gap of 0.58 volts between the far end off hook and far end on hook determination to thereby provide a safety margin between the voltage ranges of each determination. Thus, the difference between the far end off hook for a maximum cable length and the far end on hook for a no impedance cable is separated by over 0.5 volts to enable processor 101 to make an accurate determination without ambiguity. The boxes on the right hand side of the vertical scale are indicative of the similar determinations made when the DX signalling circuit 100 is off hook. In this case, the far end off hook for no cable to maximum cable length ranges between 0 and 2.53 volts while the far end on hook measurements vary from 3.51 to 5 volts for the near end DX signalling circuit 100 being off hook. The safety margin between far end off hook and far end on hook for the DX signalling circuit 100 being in an off hook state 0.95 volts again enabling processor 101 to make an accurate determination of the state of the far end unit 104 since the two determination ranges do not overlap.

In summary, the no balance duplex signalling circuit of the present invention is able to determine the signalling state of the far end unit 104 for varying ranges of cable length without requiring that a balanced connection from the DX signalling circuit 100 to the cable 103 be implemented. This is accomplished by providing a range of measurable values of voltage on the signalling leads as a function of the active state of the DX signalling circuit 100. This data is used by processor 101 to make an unambiguous determination of the signalling state of the far end unit 104 even though the impedance of the associated cable 103 may change over time and the quality of the connection between DX signalling circuit 100 and cable 103 may vary from balanced to unbalanced. Thus, processor 101 by the use of its state table operation and the set of threshold values stored in its memory can dynamically adjust for varying conditions of the associated cable and signalling state of the far end unit 104 without requiring intervention of a craftsperson to reset switches or re-establish a balanced connection to cable 103. This dynamic adaptability in automatic compensation is not found in any prior art DX signalling circuit.

While a specific embodiment of this invention has been disclosed, it is expected that those skilled in the art can and will design alternate embodiments of this invention that fall within the scope of the appended claims.

We claim:

1. A trunk signalling apparatus for providing control signalling in a telephone transmission system that uses first and second conductors to interconnect first and second end points, and that includes a plurality of signalling states indicative of the on hook and off hook states of said first and second end points, comprising:
   first and second impedance means connected in said first and second conductors, respectively;
   means for measuring the differential voltage across said first and second impedance means; and
   means, connected to said measuring means, for identifying the one of said plurality of signalling states of both said first and second end points as a function of said measured differential voltage across said first and second impedance means, including:
   means for storing predetermined threshold data indicative of the correspondence between said measured differential voltage and said on hook and off hook states of said first and second end points,
   means for adaptively selecting a threshold from said stored data based on the previous signalling states of said first and second end points,
   means for comparing said measured differential voltage across said first and second impedance means with said selected threshold, and
   means for selecting one of said plurality of signalling states based on said comparison.

2. The apparatus of claim 1 further including:
   means for switchably connecting said measuring means across said first and said second impedance means.

3. The apparatus of claim 1 wherein said identifying means further includes:
   means for averaging said measured differential voltage over a predetermined period of time to cancel transient variations in said measured differential voltage.

4. The apparatus of claim 2 wherein said identifying means further includes:
   means for converting said measured differential voltage to a digital representation of said measured differential voltage;
   means for applying said digital representation to said comparing means.

5. A trunk signalling apparatus for providing control signalling in a telephone transmission system that uses first and second conductors to interconnect first and second end points, and that includes a plurality of signalling states indicative of the on hook and off hook status of said first and second end points, comprising:
   first and second resistors connected in said first and second conductors, respectively;

means, having first and second input terminals, for measuring a voltage across said first and second input terminals;

means for switchably connecting said first and second input terminals of said measuring means across said first and said second impedance means; and processor means, connected to said measuring means, for identifying the one of said plurality of signalling states of both said first and second conductors as a function of the measured differential voltage across said first and second impedance means, including:

means for storing predetermined threshold data indicative of the correspondence between said measured differential voltage and said on hook and off hook states of said first and second end points, means for adaptively selecting a threshold from said stored data based on the previous signalling states of said first and second end points, means for comparing said measured differential voltage across said first and second resistors with said selected threshold, and means for selecting one of said plurality of signalling states based on said comparison.

* * * * *

UNITED STATES PATENT AND TRADEMARK OFFICE
CERTIFICATE OF CORRECTION

Page 1 of 2

PATENT NO. : 5,247,574
DATED : Sep. 21, 1993
INVENTOR(S) : Slife et al.

It is certified that error appears in the above-indentified patent and that said Letters Patent is hereby corrected as shown below:

Title page, item [56],, delete "Whittaker" and substitute --Whitaker--

Column 1, line 14, delete "wide" and substitute --a wide--

Column 2, line 58, delete "media" and substitute --medium--

Column 5, line 4, delete "form" and substitute --form a--

Column 6, line 22, delete "disconnect" and substitute --disconnect,--

Column 7, line 1, delete "indicate" and substitute --to indicate--

Column 7, line 30, delete "is"

Column 7, line 50, delete "0.95 volts" and substitute --is 0.95 volts,--

Drawings:
Replace FIG. 1 with correct FIG. 1

Signed and Sealed this

Fifth Day of April, 1994

Attest:

BRUCE LEHMAN

*Attesting Officer*     *Commissioner of Patents and Trademarks*